United States Patent

[11] 3,563,456

| [72] | Inventor | Wendell H. Hendricks |
| --- | --- | --- |
| | | Wichita, Kans. |
| [21] | Appl. No. | 855,864 |
| [22] | Filed | Sept. 8, 1969 |
| [45] | Patented | Feb. 16, 1971 |
| [73] | Assignee | Robert A. Strong |
| | | Wichita, Kans. |

[54] TYPE-FITTING CALCULATOR APPARATUS
8 Claims, 5 Drawing Figs.

[52] U.S. Cl. .................................................. 235/89, 235/61
[51] Int. Cl. .................................................. G06c 3/00
[50] Field of Search .......................................... 235/613, 85, 89, 70, 70.1

[56] References Cited
UNITED STATES PATENTS

| 1,354,977 | 10/1920 | Kammeyer ............... | 235/89X |
| 2,307,534 | 1/1943 | Olson ....................... | 235/61 |
| 2,575,288 | 11/1951 | Nielsen ..................... | 235/70 |
| 3,038,655 | 6/1962 | Hill ........................... | 235/61 |
| 3,410,483 | 11/1968 | Hogan ....................... | 235/89 |

Primary Examiner—Richard B. Wilkinson
Assistant Examiner—Stanley A. Wal
Attorney—John H. Widdowson ABSTRACT: This invention is a type-fitting calculator apparatus having a type-fitting calculator chart with a plurality of indicia thereon; an actuator slide member provided with indicia thereon movable relative the calculator chart; and a swing slide member having line indicia thereon adapted to cooperate with the indicia on the slide member and the calculator chart. More particularly, this invention is a calculator apparatus providing for the logarithmic relationship of various indicia in order to correlate the number of characters in a given newspaper or printed article relative to the size of the type; the amount of spacing between lines; the selection of type; and the width of the particular column so as to ascertain the resultant length or depth of the column to be arrived therefrom to aid in type-setting operations.

INVENTOR.
WENDELL H. HENDRICKS

INVENTOR.
WENDELL H. HENDRICKS

BY
John H. Widdowson
ATTORNEY

TYPE-FITTING CALCULATOR APPARATUS

Numerous types of calculator devices are known to the prior art operable to take variables and attempt to achieve a resultant answer therefrom in a simplified manner. However, it is noted that none of the prior art devices are operable similar to the applicant's invention and, in fact, none have been found which relate to the particular function of calculating for type-fitting purposes to determine the length of a column of type to be derived from a given number of characters used in the article. In fact, the other types of calculating devices found in the prior art are not operable nor provided with structure similar to the applicant's invention and fails to teach such function.

In one preferred embodiment of this invention, a type-fitting calculator apparatus is provided having a main type-setting calculator chart; an actuator slide member mounted upon the calculator chart for lateral movement between a plurality of support post members; and a swing slide member adapted to be pivotally connected by a releasable anchor means to the type-fitting calculator chart and having line indicia thereupon to be cooperatively engageable over portions of the calculator chart and the actuator slide member to achieve the desired result therefrom. More particularly, the type-setting calculator chart is provided with a point/leading scale having point/leading indicia thereon; a calculator scale having logarithmic character indicia thereon; and an instruction indicia along the lower portion of the calculator chart setting forth the details of operation; and a starting line indicia extended transversely of the point/leading indicia and the character indicia. The actuator slide member is provided with a pica wide scale and additionally, a column inch scale thereon. The pica wide scale is provided with pica wide indicia indicative of the width of the column to be utilized depending upon the size of the type being used. The column inch scale is provided with a column indicia which sets forth the resultant answer to be derived from the calculator apparatus of this invention. The actuator slide member is movable in manner generally parallel to the point/leading scale and the character scale on the calculator chart. The swing slide member is provided with a line indicia having a hole at one end adapted to receive an anchor pin member so that the same can be placed at a proper position on the point/leading scale whereupon the upper portion of the line indicia is adapted to be aligned with the number of characters within a given article as shown on the character indicia so that the intersection of the line indicia with the column inch scale indicia provides the desired answer on operation of this invention. All of the aforementioned scales are of a logarithmic nature and the size and vertical spacing relative to each other is of a predetermined nature in order to achieve the answers and function of this invention.

One object of this invention is to provide a type-fitting calculator apparatus overcoming and achieving the functions not shown or taught by the aforementioned prior art devices.

A further object of this invention is to provide a calculator apparatus operable to use the variables of size of type; extra spacing between lines; number of characters within a given article; and the width of a column so as to ascertain therefrom in a most efficient and effective manner the resultant length or depth of the column in inches to be achieved therefrom.

Still, another object of this invention is to provide a type-fitting calculator apparatus having a swing slide member and an actuator slide member movably mounted and operably connected to a main type-setting calculator chart so as to take in all variables necessary in writing a newspaper article to find out the actual length of the article to be achieved therefrom from the number of characters to be contained therein.

Still, one further object of this invention is to provide a type-fitting calculator apparatus utilizing logarithmic indicia scales placed in a predetermined spaced relationship upon a calculator chart so as to determine the number of column inches to be achieved from a given number of characters in a given printed article.

Another object of this invention is to provide a type-fitting calculator apparatus which is economical to manufacture; simple to use; and provides the desired answer in a minimum amount of time achieving monetary labor savings.

Various other objects, advantages, and features of the invention will become apparent to those skilled in the art from the following discussion, taken in conjunction with the accompanying drawings, in which.

Figure 1:
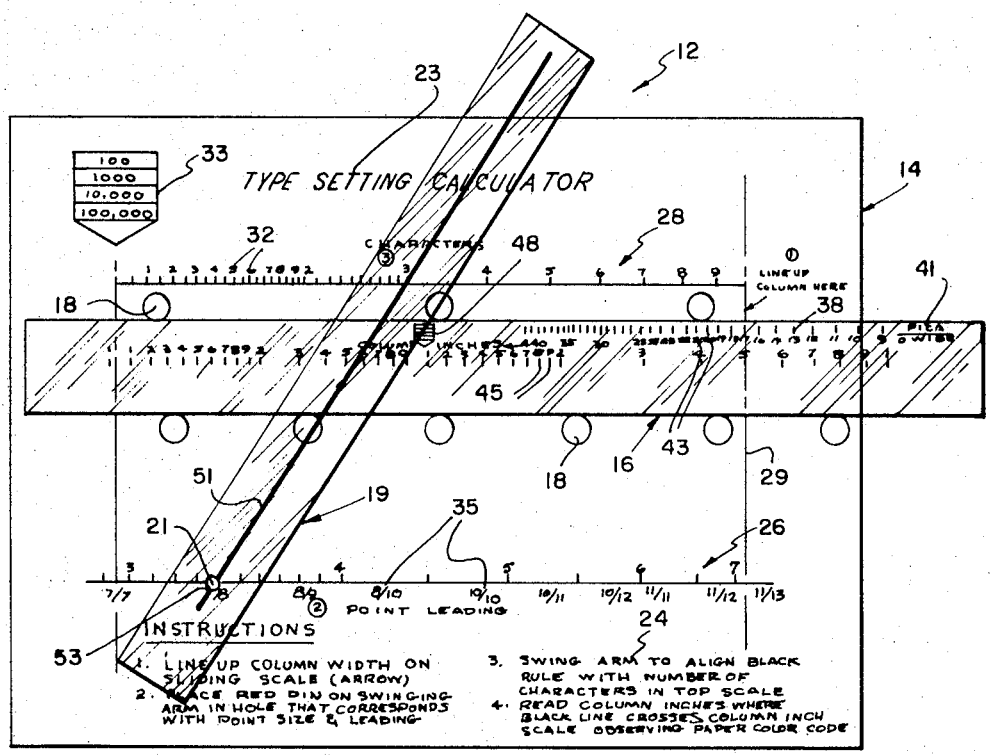
FIG. 1 is a top plan view of the type-fitting calculator apparatus of this invention.
Figure 2:
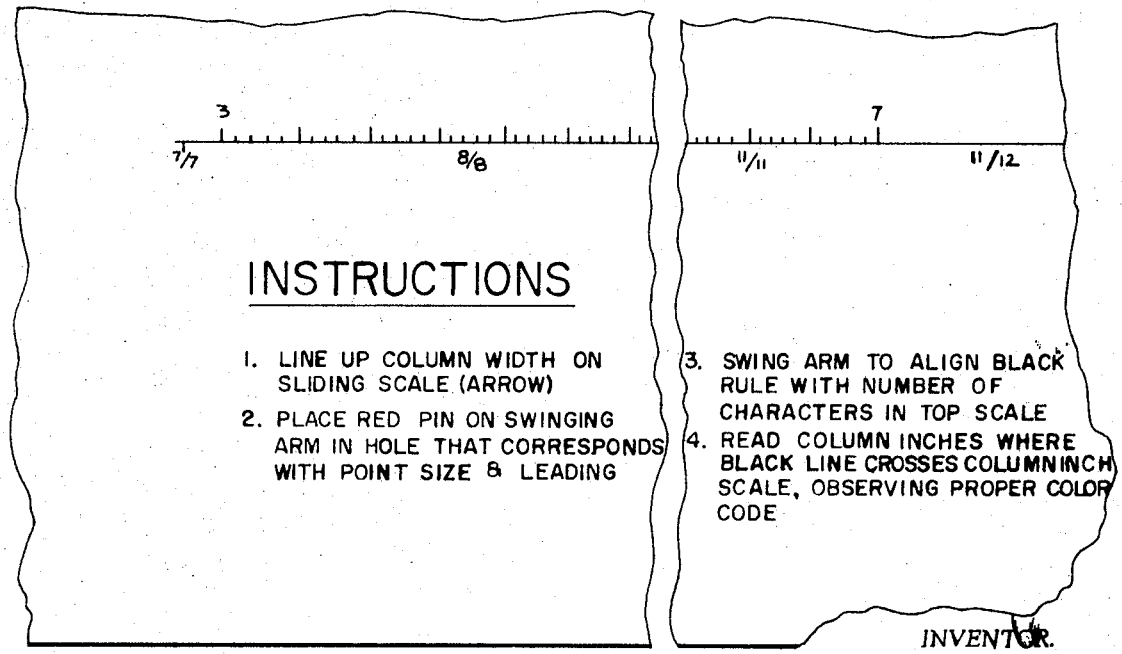
FIG. 2 is an enlarged fragmentary sectional view of the calculator chart of this invention illustrating the instruction indicia thereon.

The following is a discussion and description of preferred specific embodiments of the new type-fitting calculator apparatus of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1 the type-fitting calculator apparatus of this invention, indicated generally at 12, is shown in its normal, horizontal usage position. The type-fitting calculator apparatus 12 includes a main type-setting calculator chart 14; an actuator slide member 16 positioned between control and support guide posts 18 on the calculator chart 14; and a swing slide member 19 to be pivotally connected by anchor means 21 to the type-setting calculator chart 14 in a manner to be d3scribed in detail.

As shown in FIG. 1, the type-setting calculator chart 14 is of a generally rectangular shape having at the upper central portion an identification indicia 23 being "TYPE-SETTING CALCULATOR" and provided adjacent the lower edges thereof with instruction indicia 24. Therebetween, the calculator chart 14 is provided with a point/leading scale 26; a character scale 28; and a starting point or line indicia 29 extended transversely of the point/leading scale 26 and the character scale 28.

It is seen that the character scale 28 is provided with character indicia 32 in a logarithmic form whereupon it is obvious that the character scale indicia 32, for example, the number 3 could be indicative of 3 characters, 300 characters, 3,000 characters, etc. but further use and possible confusion relative to this will be explained in detail. In fact, it is seen that a color code indicia 33 is provided at the left-hand portion, as viewed in FIG. 1 of the character scale 28, which will be cooperating with the additional such indicia as will be explained.

The point/leading scale 26 is provided with a point/leading indicia 35 thereupon extended parallel to the aforementioned character indicia 32. The point/leading indicia 35 integrates two known variables, namely, (1) the size of the type being used, and (2) the amount of extra space to be left between the parallel lines of type. For example, the point/leading indicia 35 of the "10/10" means that you are using a 10 point type with no extra space therebetween. Also, it is seen that the point/leading indicia 35 of "10/11" means you are utilizing a 10 point type of one point of lead added. Lead is an old apprentice term referring to a thin flat piece of lead that is inserted between lines of type to use up surplus space in case the given type did not fill up the given space. The lead was cast into one point, two points, etc. increments. Although, the point/leading indicia 35 provided on the calculator chart 14 in this example applies particularly to type set on an IBM typesetter, it would be obvious that the same could be readily changed in other systems in setting up the "point/leading indicia" to conform with other specific machines if systems other than IBM are used.

Figure 3:
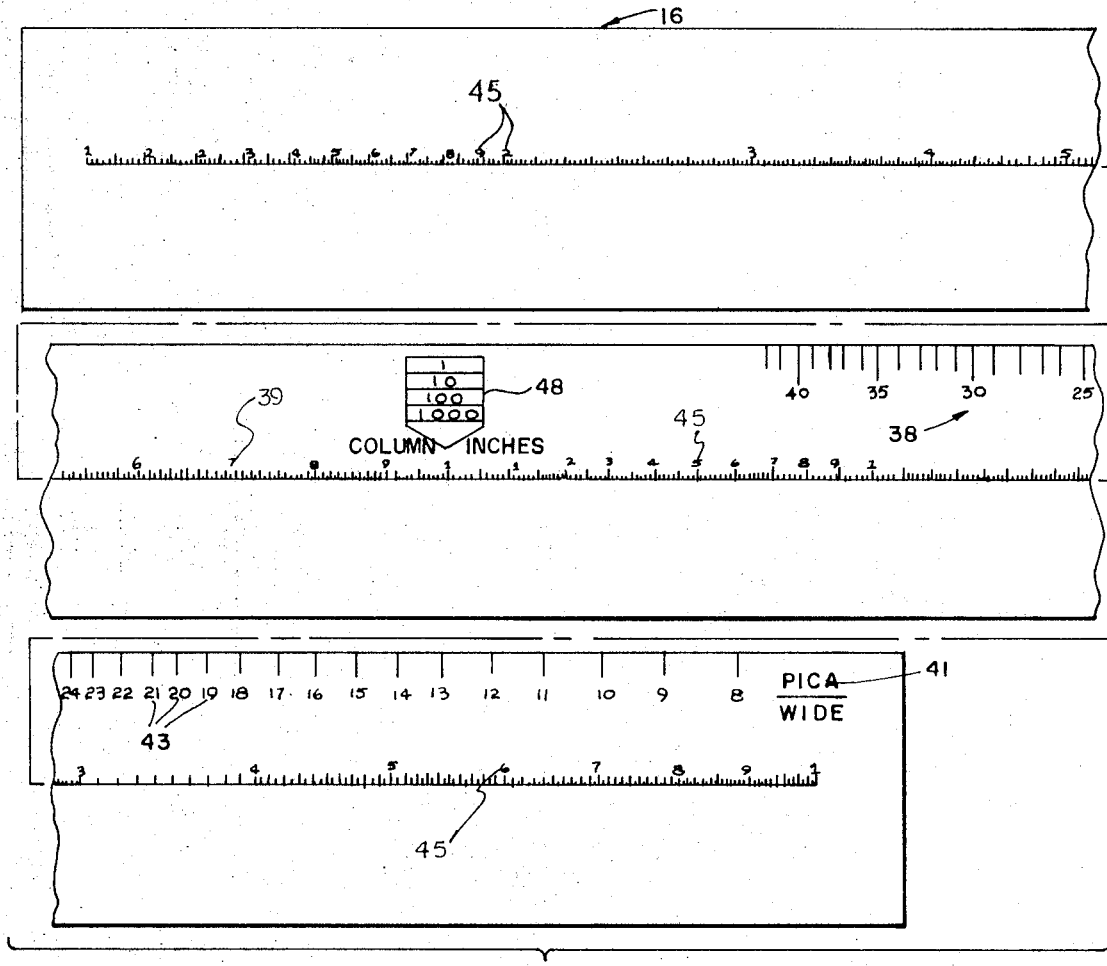
FIG. 3 is an enlarged plan view of the actuator slide member of the calculator apparatus of this invention.

As shown in FIGS. 1 and 3, it is seen that the actuator slide member 16 is constructed of a given width so as to be readily mountable in a snug manner between the guideposts 18 for movement parallel to the point/leading scale 26 and the character scale 28 in a manner to be described. The actuator slide member 16 is preferrably constructed of a clear plastic material and has thereon a pica wide scale 38 and a column inch scale 39. The pica wide scale 38 is provided with an identifying indicia 41 and a pica wide indicia indicated at 43. The pica wide indicia 43 is indicative of the width of the column to be utilized. The column inch scale 39 is provided with a logarithmic column indicia 45 which achieves the final resultant answer desired of this invention. It is seen that the column inch indicia 45 is provided with a color coded indicia 48 at the division of the adjoining logarithmic scales and cooperates in color coding to that of the color coded indicia 33 adjacent the character indicia 32. In other words, it is seen that the logarithmic numerals upon the column inch indicia 45 such as six may mean a column inch length or depth of 6 inches, 60 inches, 600 inches, 6,000 inches, etc. and such has to be related to the number of characters utilized on the character indicia 32. For example, color coded indicia 33 may have numeral 100 in red background; 1,000 in blue; 10,000 in yellow; and 100,000 in green, being indicative of the range of number of characters being used. This corresponds to color coded indicia 48 wherein the column inch numeral 1 is in a red background, 10 is in blue, 100 is in yellow, and 1,000 is in green corresponding to the color coded indicia 33 to arrive at the proper answer as will be explained.

The swing slide member 19 is preferably constructed of a thin clear plastic material to become obvious and for reasons shaped similar to a conventional slide rule. The swing slide member 19 is provided with an elongated straight line indicia 51 and having a hole 53 adjacent one end thereof to receive the anchor means 21 therein. The anchor means 21 can merely be a pin member which can be releasably placed into the calculator chart 14 so as to be positioned at a selected position on the point/leading indicia 35 in the manner to be explained in detail.

Figure 4:
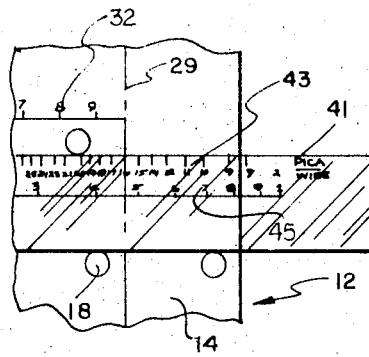
FIGS. 4 and 5 are fragmentary plan views illustrating the use and operation of the type-fitting calculator apparatus of this invention in solving a given problem.

In the use and operation of the type-fitting calculator apparatus 12 of this invention, it is seen that the actuator slide member 16 is placed between the guide posts 18 so as to be movable axially therebetween. In solving a problem with the calculator apparatus 12 of this invention, let us refer to FIGS. 4 and 5 where we set up a hypothetical situation. We shall assume that the column width in this particular example is indicated by the pica wide indicia 43 of "16" whereupon this indicates the column width to be utilized and the actuator slide member 16 moved axially to align the pica wide indicia 43 of "16" with the upright starting line indicia 29 which, of course, is aligned with the end of the character indicia 32. Thereupon, this conforms with instruction 1 of the instruction indicia 24.

Figure 5:
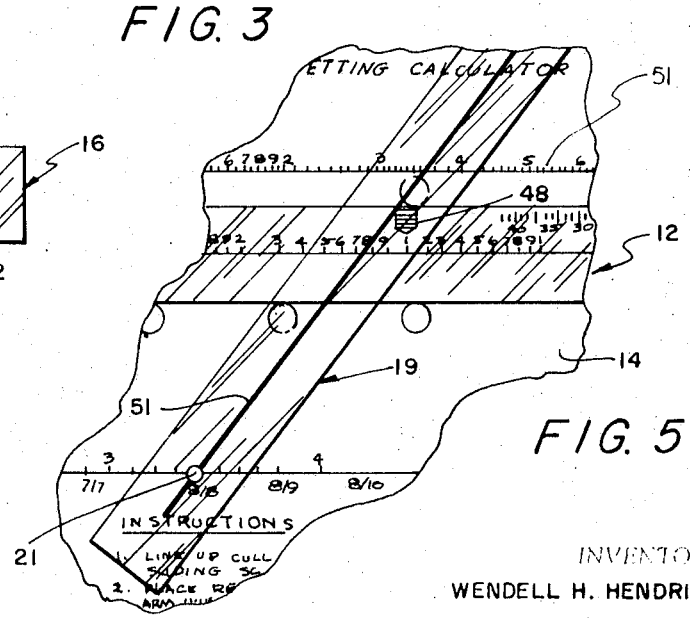

Next, we determine the point size and leading to be utilized and, in this instance, we have indicated that we will use a point/leading indicia 35 of "8/8" whereupon the pin member 21 is placed through the hole 53 in the swing slide member 19 into the point/leading indicia 35 of "8/8" as shown in FIG. 5. Thereupon, we next consider the number of characters to be utilized in a given printed article, and in this case, we have assumed that 360 characters are to be used whereupon the line indicia 51 is aligned on 3.6 on the character indicia 32. It is understood that this can also mean 36 or 36,000, etc. characters so care is taken to correlate the same with the color code indicia 33 and 48. While aligning the line indicia 51 with 360, we thereupon look to the column inch indicia 45 of the column inch scale 39 whereupon we see that the answer is 7.5 inches. However, we need to consider that this could be 750 inches but on correlation of our color code with the color code indicia 33 and 48, we can see that the resultant answer is in terms of inches, the answer being 7.5 inches. In construction of the type-setting calculator chart 12 of this invention, it is to be noted that there is a critical relationship on the vertical spacing of the logarithmic scales relative to the character scale 28; the point/leading scale 26; and the column inch scale 39. This is because all of the scale herewith are logarithmic and the critical vertical spacing thereof is a mathematical relationship. In fact, the relationship is as follows:

$d^1$ = decade length of number of character scale
$d^2$ = decade length of point/leading scale
$a$ = distance between number of character scale and point/leading scale.
$a^1$ = distance between point/leading scale and center column inch scale.

Thus:

$$\frac{d^1}{d^2} \times a = a^1$$

It is seen therefore the various relationships of the scales can be altered as long as the proper vertical spacing is remained according to the above formula.

It is seen that the type-fitting calculator apparatus of this invention is operable in a new and novel manner so as to utilize all the variables such as the width of the column; the point/leading scale utilized; and the number of characters so as to achieve in an efficient and effective manner the result of the length or depth of the column to be read. It is obvious that the type-fitting calculator apparatus of this invention is a great labor-saving device resulting in substantial monetary savings and is operable in a simplified manner according to the instruction indicia to achieve in a minimum amount of time the resultant answer therefrom. Previously, the calculations of the depth of a given column was a long and tedious process only being achieved by those skilled in the art whereas the calculator apparatus of this invention provides the same to be done in an easy, unskilled manner. Also, the calculator apparatus of this invention is economical to manufacture; simple to use; and provides reliable data necessary to those in the printing art.

The aforementioned invention has been described in conjunction with preferred specific embodiments thereof, it will be understood that this description will be intended to illustrate and not to limit the scope of the invention as defined by the following claims.

I claim:

1. A type-fitting calculator apparatus, comprising:
   a. a calculator chart having a character scale and a point/leading scale thereon in substantially spaced parallel relationship,
   b. an actuator slide member mountable on said calculator chart between and substantially parallel to said character scale and said point/leading scale having a pica wide scale and a column inch scale thereon; and
   c. a swing slide member having line indicia thereon, said line indicia extended transversely of predetermined points on said character scale, said point/leading scale, and said actuator slide member whereby the intersection of said line indicia and said column inch scale indicates the desired answer.

2. A type-fitting calculator apparatus as described in claim 1, wherein:
   a. said character scale having a character indicia thereon representative of the number of characters in an article including spaces, and
   b. said point/leading scale having point size and leading indicia including the size of the type and amount of extra space between lines of type.

3. A type-fitting calculator apparatus as described in claim 2, wherein:
   a. said pica wide scale having a pica wide indicia indicative of the width of the column of set type, and
   b. said column inch scale having logarithmic column inch indicia indicative of the length of a given article in inches.

4. A type-fitting calculator apparatus as described in claim 3, including:
   a. a pin member to pivotally connect said swing slide member to said calculator chart at preselected point of intersection of said line indicia and said point size and leading indicia so as to align said line indicia with said character indicia to read the answer on said column inch indicia.

5. A type-fitting calculator apparatus as described in claim 1, wherein:
   a. said calculator chart having a plurality of spaced guide posts to receive said actuator slide member snugly therebetween for longitudinal movement.

6. A type-fitting calculator apparatus as described in claim 5, wherein:
   a. said calculator chart having color-coded range indicia adjacent said character scale; and
   b. said actuator slide member having color-coded range indicia adjacent said column inch scale whereby said color-coded range indicia cooperate to correlate the proper length of column inches relative to number of characters.

7. A type-fitting calculator apparatus as described in claim 6, wherein:
   a. said calculator chart having instruction indicia thereon setting forth the use and operation of said calculator apparatus;
   b. said actuator slide member movable to align a predetermined portion of said pica wide scale with a starting line indicia on said calculator chart with said point/leading scale; and
   c. said swing slide member pivoted to align said line indicia with a predetermined point of said character scale and the intersection of said line indicia and said column inch scale being the answer of column inches achieving the resultant function of this invention.

8. A type-fitting calculator apparatus as described in claim 7, wherein:
   a. the length of said character scale and said point/leading scale predetermined relative to the lateral spacing to each other and said column inch scale to achieve the function of this invention.